(12) United States Patent
Tsukamoto et al.

(10) Patent No.: US 8,842,955 B2
(45) Date of Patent: Sep. 23, 2014

(54) OPTICAL FIBER CABLE

(75) Inventors: Masayoshi Tsukamoto, Tokyo (JP); Yutaka Hoshino, Tokyo (JP); Noboru Okada, Tokyo (JP)

(73) Assignee: Furukawa Electric Co., Ltd., Tokyo (JP)

(*) Notice: Subject to any disclaimer, the term of this patent is extended or adjusted under 35 U.S.C. 154(b) by 394 days.

(21) Appl. No.: 13/142,163

(22) PCT Filed: Dec. 24, 2009

(86) PCT No.: PCT/JP2009/071479
§ 371 (c)(1),
(2), (4) Date: Jun. 24, 2011

(87) PCT Pub. No.: WO2010/074167
PCT Pub. Date: Jul. 1, 2010

(65) Prior Publication Data
US 2011/0255834 A1    Oct. 20, 2011

(30) Foreign Application Priority Data
Dec. 25, 2008  (JP) ................................ 2008-330237

(51) Int. Cl.
*G02B 6/44*  (2006.01)
(52) U.S. Cl.
CPC ............ *G02B 6/4402* (2013.01); *G02B 6/4433* (2013.01)
USPC .......................................... 385/102; 385/100
(58) Field of Classification Search
None
See application file for complete search history.

(56) References Cited

U.S. PATENT DOCUMENTS

| | | |
|---|---|---|
| 5,561,731 A | 10/1996 | Cooke et al. |
| 6,060,541 A | 5/2000 | Anderson et al. |
| 6,133,931 A | 10/2000 | Yoshikawa et al. |
| 6,398,190 B1 | 6/2002 | Li |
| 6,597,846 B1 | 7/2003 | Fujii et al. |
| 7,455,941 B2 | 11/2008 | Evans et al. |
| 7,813,606 B2 | 10/2010 | Yasutomi et al. |
| 2003/0044138 A1 | 3/2003 | Kusakari et al. |
| 2003/0133676 A1 | 7/2003 | Kobayashi et al. |

(Continued)

FOREIGN PATENT DOCUMENTS

| | | |
|---|---|---|
| GB | 2 193 583 A | 2/1988 |
| JP | 1-190762 | 7/1989 |

(Continued)

OTHER PUBLICATIONS

Office Action mailed Jun. 28, 2012 in co-pending U.S. Appl. No. 13/054,968.

(Continued)

*Primary Examiner* — Sarah Hahm
(74) *Attorney, Agent, or Firm* — Oblon, Spivak, McClelland, Maier & Neustadt, L.L.P.

(57) ABSTRACT

An optical fiber cable enabling further reduction of possibilities of disconnection of optical fiber due to, for instance, cicada oviposition. The optical fiber cable (10) is provided with: an optical fiber core (1); a tension member (2), which is arranged in parallel to the optical fiber core (1) on one side or on the both sides of the optical fiber core (1); and a sheath (3) which integrally covers the optical fiber core (1) and the tension member (2). At least one portion of the sheath (3) is composed of a polymeric material having a yield point stress of 12 MPa or higher.

4 Claims, 8 Drawing Sheets

(56) References Cited

U.S. PATENT DOCUMENTS

| | | |
|---|---|---|
| 2004/0087759 A1 | 5/2004 | Malik et al. |
| 2007/0134502 A1 | 6/2007 | Fonda |
| 2007/0141493 A1 | 6/2007 | Evans et al. |
| 2008/0037940 A1 | 2/2008 | Park |
| 2008/0220355 A1 | 9/2008 | Kamoi et al. |
| 2009/0034922 A1 | 2/2009 | Yasutomi et al. |
| 2010/0322573 A1 | 12/2010 | Yasutomi et al. |
| 2011/0150402 A1 | 6/2011 | Hoshino et al. |
| 2013/0040234 A1 | 2/2013 | Zhang et al. |

FOREIGN PATENT DOCUMENTS

| | | |
|---|---|---|
| JP | 2001-35265 | 2/2001 |
| JP | 2001-264601 | 9/2001 |
| JP | 2003-43324 | 2/2003 |
| JP | 2004-272069 | 9/2004 |
| JP | 2006-163209 | 6/2006 |
| JP | 2006 163337 | 6/2006 |
| JP | 2007 101586 | 4/2007 |
| JP | 2007 272199 | 10/2007 |
| JP | 2008129062 A * | 6/2008 |
| WO | WO 93/05424 A1 | 3/1993 |
| WO | 2008 90880 | 7/2008 |

OTHER PUBLICATIONS

Office Action mailed Jan. 18, 2013 in co-pending U.S. Appl. No. 13/054,968.

International Search Report issued Jan. 26, 2010 in PCT/JP09/71479 filed Dec. 24, 2009.

Kobunshi Daijiten, Maruzen Co., Ltd./Nobuo Suzuki, Sep. 20, 1994, pp. 106 to 107.

Japanese Office Action issued Sep. 7, 2010 in JP 2008 330237 filed Dec. 25, 2008 (with English translation).

Office Action mailed Oct. 7, 2013, in co-pending U.S. Appl. No. 13/054,968.

Office Action issued Feb. 12, 2014 in Japanese Patent Application No. 2008-204563 (with English translation).

Yoshiaki Nago, et al, "Tei-masatsu oyobi tai-mamousei wo koujyou saseta nannen-sei doroppu keburu (Flame retardant optical drop cable with low frictional and wear resistant sheath)", in Proceedings 2 of the 2006 IEICE Society Conference, Sep. 7, 2006, 3 pages (lect. No. B-10-5) (with partial English translation).

Hiroshi Nakamura, et al., "Hikari faiba keburu gaihi no tei-masatsu-ka ni kansuru kentou (1) (Study on low coefficient of friction for optical fiber cable jacket (1) )", in proceedings 2 of the 1999 IEICE Society Conference, Aug. 16, 1999, 5 pages (lect. No. B-10-28) (with partial English translation).

Yoshinori Kurosawa, et al., Hikari keburu you tei-masatcu sisu no kentou (Study on Low Friction sheath of Optical-fiber Cable), in Proceedings 2 of the 1998 IEICE Society Conference, Aug. 16, Sep. 7, 1998, 4 pages, (lect. No. B-10-42) (with partial English translation).

Masayoshi Tsukamoto, et al., Tei-masatsu hikari doroppu keburu no kaihatsu (Development of Optical drop cable with low frictional jacket), in Communication 2 of Proceedings of the IEICE General Conference , Mar. 8, 2006, 4 pages, (lect. No. B-10-18) (with partial English translation).

K. Ono, et al., "Tajo—fusetsu ni tekishita hikari keburu you sisu zairyou no kentou (A Study on Optical fiber Cable Sheath Materials for Multi-Cable Installation)", in vol. 97 of Mitsubishi Cable Industries review, Jan. 10, 2001, pp. 30-35 (with English summary).

Extended European Search Report issued Feb. 10, 2014 in Patent Application No. 09834965.7.

* cited by examiner

OPTICAL FIBER CABLE

TECHNICAL FIELD

The present invention relates to an optical fiber cable.

BACKGROUND ART

An optical fiber core wire is generally composed of a glass optical fiber made of a silica glass or the like, and a covering applied on the outer periphery of the glass optical fiber and having a two-layer structure composed of a soft layer and a hard layer, wherein the covering is made of an ultraviolet curable resin, a thermo-setting resin, or the like. The soft layer (hereinafter referred to as a primary covering layer) contacting with the glass optical fiber is made of a soft resin having a comparatively low Young's modulus and functions as a buffer layer (stress relaxation layer). The hard layer (hereinafter referred to as a secondary covering layer) situated on the outer periphery of the primary covering layer is made of a hard resin having a comparatively high Young's modulus and functions as a protection layer. Further, a very thin colored layer for identification is sometimes applied on the outer periphery of the secondary covering layer as the occasion demands.

Generally, as the primary covering layer, a resin having a Young's modulus of 3 MPa or less after coating is used, and as the secondary covering layer, a resin having a Young's modulus of 500 MPa or more is used.

Various types of optical fiber cables having a sheath integrally covering the optical fiber core wire and at least one tension member provided parallely to the optical fiber core wire on one side or both sides of the optical fiber core wire are being manufactured and used. Moreover, when such an optical fiber cable is aerially laid, a supporting wire covered with a sheath is generally attached in the lengthwise direction of the optical fiber cable.

When such optical fiber cables are aerially laid, degradation in their characteristics of an unknown origin occasionally occurs as time elapses. The cause of this degradation in their characteristics has recently proved to be the ovipositional behaviors of cicadae into the optical fiber cables, which develop in summer, especially Cryptotympana facialises.

In particular, the cause is the behavior of a Cryptotympana facialis to misjudge an aerially laid optical fiber cable to be a trunk or a branch of a tree and thrust the ovipositor of the Cryptotympana facialis into the sheath of the optical fiber cable to lay eggs into the optical fiber cable.

If the ovipositor is thrust into the sheath in such a way, the ovipositor is thrust into the inner optical fiber damaging the optical fiber, and the optical fiber is disconnected.

Accordingly, various methods for preventing the disconnecting of optical fibers due to the ovipositional behaviors of cicadae and the like have been proposed. For example, the method of forming slit-shaped notches wherein the tip lines reach the neighbor of an optical fiber at almost diagonal positions with the optical fiber core wire put between the positions on the surface of the sheath as described in Japanese Patent Application Laid-Open Publication No. 2006-163337 and the method of forming a low friction and high strength resin composition layer on the surface of a sheath as described in Japanese Patent Application Laid-Open Publication No. 2007-101586.

DISCLOSURE OF THE INVENTION

Problems to Be Solved by the Invention

However, even when the above optical fiber cables are used, the damage of optical fibers due to the ovipositional behaviors of cicadae cannot be prevented completely.

The present invention is devised in view of the above problem and aimed to provide an optical fiber cable capable of reducing the possibility of the disconnecting of the optical fiber due to the ovipositional behaviors of cicadae and the like.

Means for Solving the Problems

In order to solve the problem and achieve the object, an optical fiber cable according to the present invention comprises an optical fiber core wire, a tension member arranged on one side or both sides of the optical fiber core wire in parallel with the optical fiber core wire, and a sheath which integrally covers the optical fiber core wire and the tension member, wherein at least a part of the sheath is made of a polymeric material having a stress at a yield point of 12 MPa or more.

In the optical fiber cable of the present invention configured as above, because the stress at the yield point thereof of the polymeric material forming the sheath is larger than the pressure (stress) at which a cicada pushes the ovipositor thereof against the sheath, the sheath can be maintained to be in the elastic region thereof even when the ovipositor of the cicada is pushed against it, and the sheath can hold the initial abrasive resistance. Thereby, the possibility of the disconnecting of the optical fiber due to the ovipositional behavior of the cicada and the like can be reduced.

Moreover, in the aspect mentioned above, the optical fiber cable according to the present invention is characterized in that the polymeric resin is composed of any one of a thermoplastic resin, a thermo-setting resin, and an ultraviolet curable resin.

Moreover, in any one of the aspects mentioned above, the optical fiber cable according to the present invention is characterized in that the polymeric material has a 0.3% modulus of 50 MPa or more.

By the optical fiber cable of the present invention configured as above, the loss changes of the optical fiber core wire at an oviposition of a cicada can be suppressed to be small.

Moreover, in any one of the aspects mentioned above, the optical fiber cable of the present invention is characterized in that the polymeric material has a tensile strength within a range of from 5 MPa or more to 20 MPa or less.

The optical fiber cable of the present invention configured as above has a tensile strength of 20 MPa or less, consequently the optical fiber core wire can easily be taken out from the optical fiber cable not only under an ordinary temperature environment but also under a low temperature environment of about −20° C. Furthermore, because the tensile strength is 5 MPa or more, the problems that the sheath be damaged at the time of laying the optical fiber cable and the like do not occur easily.

Moreover, in any one of the aspects mentioned above, the optical fiber cable according to the present invention is characterized in that the polymeric material has Shore D hardness within a range of from 30 or more to 62 or less.

According to the optical fiber cable of the present invention configured as above, because the Shore D hardness is 62 or less, it is difficult for a crack to spread at the time of forming a cut in the optical fiber cable with a nipper not only under the ordinary temperature environment but also under a low temperature environment of about −20° C. Consequently, good separation operation of a supporting wire can be performed even under the low temperature environment. Furthermore, because the Shore D hardness is 30 or more, the problem that the sheath be damaged at the time of laying the optical fiber cable and the like do not occur easily.

Effects of the Invention

According to the present invention, an optical fiber cable capable of reducing the possibility of the disconnecting of the optical fiber caused by an ovipositional behavior of a cicada and the like can be realized.

BEST MODE FOR CARRYING OUT THE INVENTION

Figure 1:
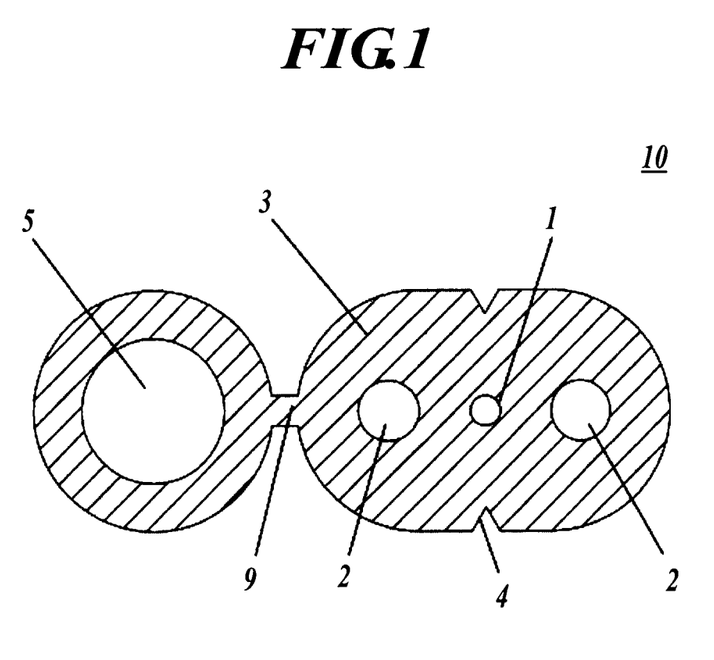
FIG. 1 is a cross sectional view showing an embodiment example of an optical fiber cable according to the present invention.

The optical fiber cables of the present invention will be described in detail in the following with reference to the accompanying drawings. FIG. 1 is a cross sectional view showing an embodiment example of an optical fiber cable 10 of the present invention.

As shown in FIG. 1, the optical fiber cable 10 of the present invention includes an optical fiber core wire 1 at the central portion thereof. This optical fiber core wire 1 includes, for example, a glass optical fiber; a primary covering layer made of an ultraviolet curable resin, a thermo-setting resin, or the like, wherein the primary covering layer is applied on the outer periphery of the glass optical fiber; a secondary covering layer applied on the primary covering layer; and a very thin colored layer for identification further applied on the outer periphery of the secondary covering layer if it is necessary. The outer diameter of the optical fiber core wire 1 is generally 250 µm. As the type of the optical fiber core wire 1, for example, a general single mode fiber (SMF) defined by ITU-T (International Telecommunication Union Telecommunication Standard Sector) G.652 can be used.

A pair of tension members 2 is arranged on both sides of the optical fiber core wire 1 in such a way that the centers of the tension members 2 are situated on almost the same plane as the center of the optical fiber core wire 1. The material of the tension members 2 is composed of, for example, aramid fiber bundles or fiber reinforced plastics (hereinafter simply referred to as FRPs) using aramid fibers as reinforcing fibers.

A sheath 3 is applied to cover the optical fiber core wire 1 and the pair of tension members 2. The sheath 3 is made of a polymeric material, and, for example, the following polymeric materials can be used: a thermoplastic resin such as polyolefin and polyurethane, a thermo-setting resin such as an unsaturated polyester resin and a silicone resin, and an ultraviolet curable resin containing urethane acrylate or polyester acrylate as the principal component thereof.

Notches 4 are formed on the outer surface of the sheath 3 in such a way that their tip lines face the optical fiber core wire 1 in order to easily tear the sheath 3 at the time of taking out the optical fiber core wire 1. The notches 4 are continuously formed along the lengthwise direction of the cable.

Furthermore, a supporting wire 5 is arranged in such a way that the center thereof is situated on almost the same plane the centers of the optical fiber core wire 1 and the pair of tension members 2, and the sheath 3 integrally covers the optical fiber core wire 1, the tension members 2, and the supporting wire 5.

Here, the supporting wire 5 is composed of, for example, a FRP wire or a galvanized steel wire, and the optical fiber cable 10 having the supporting wire 5 like this is called a self-supporting type optical fiber cable.

Further, all of the tension members 2 and the supporting wire 5 are arranged in parallel with the optical fiber core wire 1 over the whole length thereof in the lengthwise direction of the cable.

In the optical fiber cable 10, the cable main body section including the optical fiber core wire 1 therein on the observer's right side and the supporting wire section in which the supporting wire 5 is embedded therein are integrated by means of the sheath 3 with a linkage section 9, and the outer diameter of the cable main body section (the right side part of the linkage section 9 in FIG. 1) is configured so that the major axis × minor axis is about 3.1 mm×about 2.0 mm, respectively, for example.

The stress at the yield point of the polymeric material constituting the sheath 3 is 12 MPa or more.

When a stress larger than the stress at the yield point is applied to the sheath 3, the sheath 3 shifts to the plastic region (region in which a shape has deformed over an elastic region not being able to recover from the deformation to the original shape and the deformation remains), and the abrasive resistance of the sheath 3 deteriorates more than that of the initial state. Consequently, in the state in which a cicada pushes the ovipositor thereof against the sheath 3 and the stress of the yield point thereof or more is applied to the sheath 3, the sheath 3 is easily worn away by the reciprocating rotational motion of the ovipositor.

On the other hand, when a polymeric material having a large stress at the yield point thereof is used as the polymeric material constituting the sheath 3, the sheath 3 can continue to stay in the elastic region thereof even when the cicada pushes the ovipositor against the sheath 3, and the sheath 3 can holds the initial abrasive resistance. Thereby, the possibility of the disconnecting of the optical fiber due to the ovipositional behavior of the cicada and the like can be reduced.

Here, the stress at the yield point means the "tensile yield strength" defined in JIS K7113 at 23° C. The relations between the stresses at yield points and the depths of the damages due to the ovipositional behaviors of cicadae (hereinafter referred to as oviposition damages) were examined by the use of the optical fiber cable 10 shown in FIG. 1.

First, two optical fiber cables 10 each being cut to be a length of 13 cm were combined as one set, and 20 sets of the optical fiber cables 10 (40 pieces in total) were prepared. One set of the optical fiber cables 10 (2 pieces) were put in a container of a width of 200 mm, a length of 200 mm, and a height of 300 mm with a Cryptotympana facialis at one experiment, and the average of depths of oviposition damages left in the optical fiber cables 10 was examined after 24 hours elapsed. The results are shown in FIG. 2.

Figure 2:
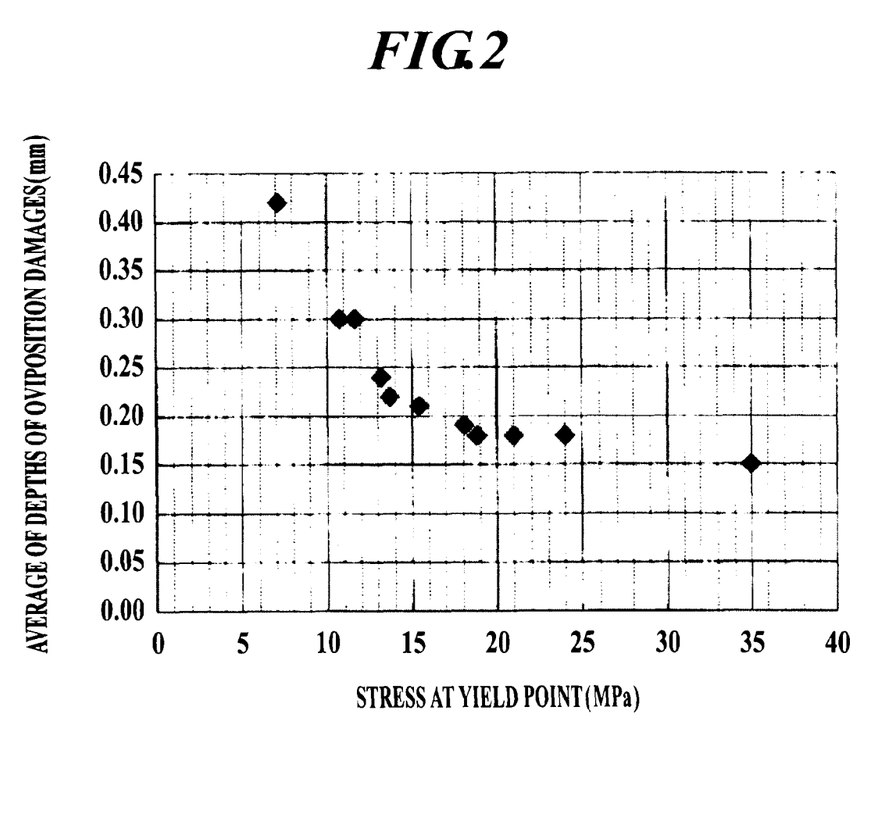
FIG. 2 is a diagram showing relations between stresses at yield points and depths of oviposition damages of optical fiber cables according to the present invention which damages associated with the ovipositional behaviors of cicadae.

As shown in FIG. 2, the larger the stress at a yield point is, the shallower the average of depths of the oviposition damages is. Accordingly, when a polymeric material having a stress at the yield point thereof of 12 MPa or more is used, it is possible to suppress the average of depths of oviposition damages to be 0.3 mm or less. When a polymeric material having a stress at the yield point thereof is 13 MPa or more is used, it is possible to suppress the average of depths of oviposition damages to be 0.25 mm or less.

In particular, in the region in which the stress at the yield point thereof is 12 MPa or less, the oviposition damages have a tendency to be deeper drastically.

Accordingly, by making the stress at the yield point be 12 MPa or more, the number of times that the ovipositor of the cicada to reach the optical fiber core wire 1 can effectively be reduced.

Here, when a thermoplastic resin is used as the polymeric material, the stress at the yield point thereof can be made to be larger by increasing the blending quantity of crystalline polyolefin.

Moreover, from the point of view of the operation for taking out a core wire, it is preferable to use a polymeric material having the stress at the yield point thereof is 20 MPa or less.

Moreover, preferably, the polymeric material for forming the sheath 3 has a 0.3% modulus of 50 MPa or more.

At the time of an oviposition of a cicada, the force when the ovipositor thereof is stuck into an optical fiber is applied to the inner optical fiber core wire 1 to bend the optical fiber core wire 1, and a loss change thereby occurs.

The loss change shows a temporal increase of the transmission loss of the optical fiber core wire 1 at the time of the oviposition. However, when the change is large (to exceed 1 dB), there is a possibility of occurrence of a temporary optical shut down, or there is also a case where the transmission loss does not return to the original transmission loss. Here, when a loss change exceeds 0.2 dB even temporarily, a problem of a communication failure sometimes arises.

Here, the 0.3% modulus is defined by JIS K7113 and means a modulus of elasticity in tension when an optical fiber cable extends by 0.3% at 23° C.

Relations between 0.3% moduli and loss changes at oviposition of cicadae are examined by the use of the optical fiber cable 10 shown in FIG. 1.

Figure 3:
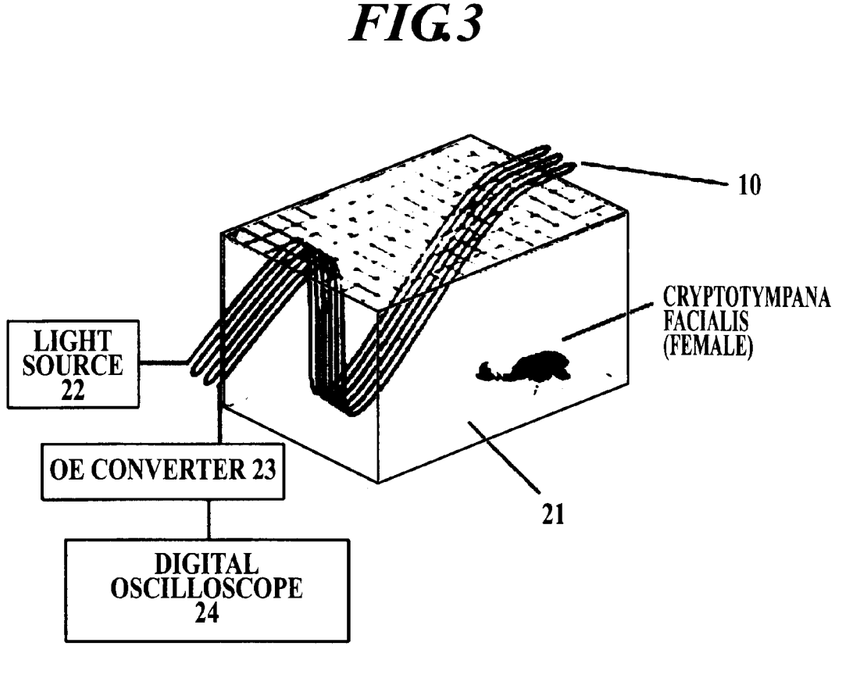
FIG. 3 is a schematic view showing a method of examining a loss change of an optical fiber cable according to the present invention at an oviposition of a cicada.

As shown in FIG. 3, the optical fiber cable 10 having a length of 3 m is made to enter the container 21 of a width of 200 mm, a length of 200 mm, and a height of 300 mm, in which a Cryptotympana facialis is housed. Then, a light source 22 of a wavelength of 1550 nm, and an OE converter 23 and a digital oscilloscope 24 are connected to both ends of the optical fiber cable 10, respectively, and loss changes which occur at oviposition are examined. The measurement interval is set to be 1 msec. The results are shown in FIG. 4.

Figure 4:
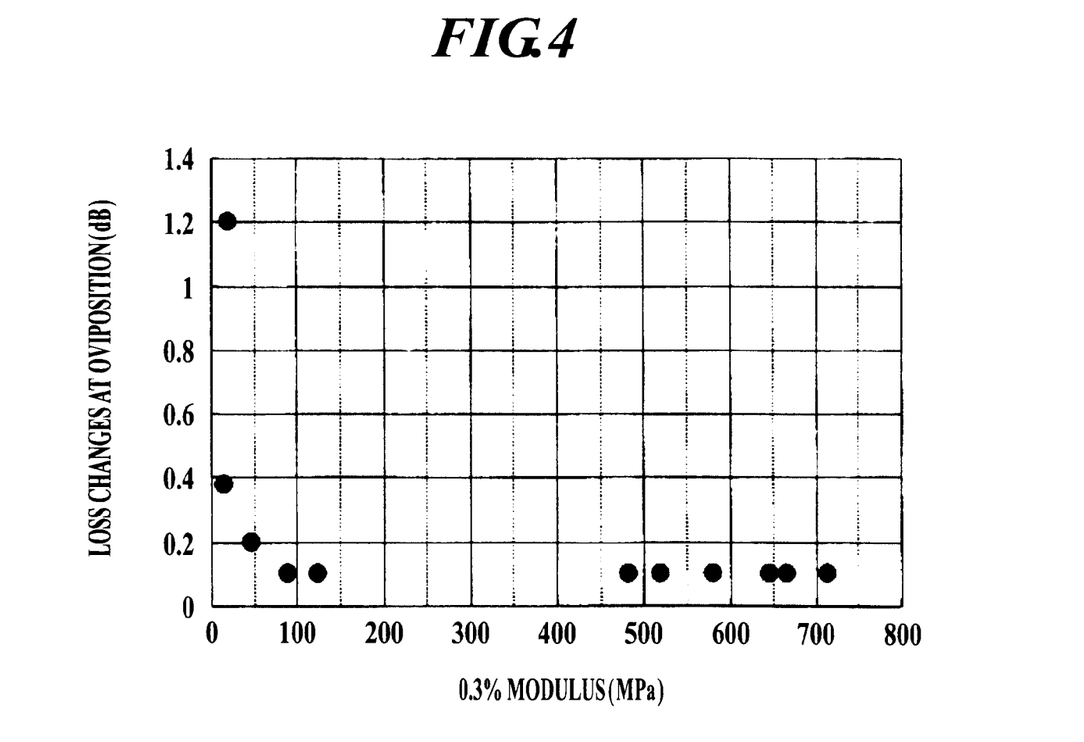
FIG. 4 is a diagram showing relations between 0.3% moduli of an optical fiber cable according to the present invention and the loss changes thereof at an oviposition of a cicada.

As shown in FIG. 4, when the 0.3% modulus of a polymeric material is small, the loss change thereof is large. It is considered that the smaller 0.3% modulus the polymeric material has, the more easily the optical fiber core wire 1 is to be bent. By making the 0.3% modulus be 50 MPa or more, the loss change at an oviposition of a cicada can be suppressed to be 0.2 dB or less. By making the 0.3% modulus 90 MPa or more, the loss change at an oviposition of a cicada can be suppressed to be 0.1 dB or less.

In particular, in a region in which the 0.3% moduli are smaller than 50 MPa, the loss changes at oviposition of cicadae become larger drastically. Accordingly, by making the 0.3% modulus be 50 MPa or more, the loss changes at oviposition of cicadae can effectively be reduced.

Here, when a thermoplastic resin is used as the polymeric material, the 0.3% modulus can be made to be larger, for example, by increasing the compounding ratio of polypropylene to be blended into base polyethylene or the additive amount of magnesium hydroxide to be added as a fire retarding material.

Moreover, from the point of view of the easiness for carrying out the fixed bent wiring in the state where the supporting wire is removed, a polymeric material having the 0.3% modulus of 800 MPa or less is preferably used.

Moreover, preferably, the polymeric material constituting the sheath 3 has a tensile strength within a range of from 5 MPa or more to 20 MPa or less.

By making the tensile strength 20 MPa or less, the optical fiber core wire can easily be taken out from an optical fiber cable not only under the ordinary temperature environment but also under a low temperature environment of about –20° C. Furthermore, by making the tensile strength be 5 MPa or more, the problems of the damages of sheaths 3 at the times of the laying of optical fiber cables 10 hardly arise.

Here, the tensile strength means the "tensile stress" defined in JIS K7113 at 23° C.

When a thermoplastic resin is used as the polymeric material, the tensile strength can be adjusted by, for example, changing the compounding ratio of polypropylene to be blended into base polyethylene or the additive amount of magnesium hydroxide added as a fire retarding material.

Moreover, the polymeric material forming the sheath 3 preferably has Shore D hardness of within a range of from 30 or more to 62 or less.

By making the Shore D hardness be 62 or less, it is difficult for a crack to spread when a cut is formed in the optical fiber cable 10 with a nipper or the like not only under the ordinary temperature environment but also under a low temperature environment of about –20° C. Consequently, a good separation operation of the supporting wire 5 can be performed even under the low temperature environment. Furthermore, by making the Shore D hardness be 30 or more, the problems such as the sheaths 3 being damaged at the times of laying the optical fiber cables 10 are difficult to occur.

Here, the Shore D hardness is the hardness defined in JIS K7215 type D at 23° C.

Further, when a thermoplastic resin is used as the polymeric material, the Shore D hardness can be adjusted by changing, for example, the compounding ratio of polypropylene blended into base polyethylene.

EXAMPLES

By adjusting the kinds (densities) of polyolefin materials to be used as bases and the kinds and the blending quantities of fire retarding materials, the stresses at yield points, the 0.3% moduli, the tensile strength and the Shore D's of thermoplastic resins are changed, and the sheaths 3 are formed by using the thermoplastic resins to manufacture the optical fiber cables 10 similar to the optical fiber cables shown in FIG. 1. By using the optical fiber cables 10, the average of depths of oviposition damages, the loss changes at oviposition, the taking-out properties under the environment of –20° C., the taking-out properties under the ordinary temperature environment, the supporting wire separation properties under the environment of −20° C., and the supporting wire separation properties under the ordinary temperature environment are evaluated.

Here, the evaluation methods of the average of depths of oviposition damages and the loss changes at oviposition are similar to those described above. Moreover, the measurements of the tensile strength are performed by using a number 2 dumbbell by a method in conformity of JIS K7113 at 23° C.

The taking-out properties under the environment of −20° C., and the taking-out properties under the ordinary temperature environment are evaluated as follows. That is, the supporting wire sections of the optical fiber cables 10 are removed to make the optical fiber cables 10 composed of only the cable main body sections, and cuts are formed on the cable main body sections from the ends thereof by 10 mm with a nipper. Thereafter, when the optical fiber cables 10 are able to be ripped without no problems when the optical fiber cables 10 are ripped with hands to the left and right directions, the taking-out properties of the optical fiber cables 10 are evaluated as O; when the optical fiber cables 10 are very difficult to be ripped only by the cuts by 10 mm and are able to be ripped when cuts are formed by 100 mm, the taking-out properties of the optical fiber cables 10 are evaluated as Δ; and when the optical fiber cables 10 are not able to be ripped even when cuts are formed by 100 mm, the taking-out properties of the optical fiber cables 10 are evaluated as X.

The supporting wire separation properties under the environment of −20° C. and the supporting wire separation properties under ordinary temperature environments are evaluated as follows. When the supporting wire sections are able to be separated without no problems when cuts are formed on the linkage sections 9 of the optical fiber cables 10 with a nipper to separate the supporting wire sections, the supporting wire separation properties of the supporting wire sections are evaluated as O; when cracks are produced but the cracks did not reach the cable main body sections, the supporting wire separation properties of the supporting wire sections are evaluated as Δ: and when cracks reached the cable main body sections; the supporting wire separation properties of the supporting wire sections are evaluated as X.

The results are shown in TABLE 1.
[Table 1]

TABLE 1

| | STRESS AT YIELD POINT (MPa) | 0.3% MODULUS (MPa) | SHORE D HARDNESS (HDD) | TENSILE STRENGTH (MPa) | AVERAGE OF DEPTHS OF OVIPOSITON DAMAGES (mm) | CORE WIRE TAKING-OUT PROPERTY (−20° C.) |
|---|---|---|---|---|---|---|
| 1 | 7.2 | 90 | 47 | 26 | 0.42 | Δ |
| 2 | 10.8 | 482 | 64 | 14 | 0.30 | O |
| 3 | 11.7 | 647 | 68 | 13.5 | 0.30 | O |
| 4 | 13.2 | 714 | 70 | 13.8 | 0.24 | O |
| 5 | 13.7 | 667 | 62 | 13.5 | 0.22 | O |
| 6 | 18.1 | 519 | 68 | 18.4 | 0.19 | O |
| 7 | 24 | 580 | 73 | 27 | 0.18 | Δ |
| 8 | 35 | 21 | 35 | 37 | 0.15 | X |
| 9 | 15.5 | 50 | 52 | 12.3 | 0.21 | O |
| 10 | 21 | 16 | 59 | 22 | 0.18 | Δ |
| 11 | 18.9 | 125 | 63 | 20.5 | 0.18 | Δ |
| 12 | 14.2 | 235 | 52 | 16.8 | 0.21 | O |
| 13 | 16.7 | 385 | 61 | 14.3 | 0.20 | O |
| 14 | 22.6 | 423 | 42 | 14.8 | 0.18 | O |
| 15 | 27.8 | 375 | 58 | 15.1 | 0.17 | O |
| 16 | 30 | 305 | 48 | 17.3 | 0.16 | O |

| | CORE WIRE TAKING-OUT PROPERTY (ORDINARY TEMPERATURE) | SUPPORTING WIRE SEPARATION PROPERTY (−20° C.) | SUPPORTING WIRE SEPARATION PROPERTY (ORDINARY TEMPERATURE) | LOSS CHANGE AT OVIPOSITION (dB) |
|---|---|---|---|---|
| 1 | O | O | O | 0.1 |
| 2 | O | Δ | O | 0.1 |
| 3 | O | X | O | 0.1 |
| 4 | O | X | O | 0.1 |
| 5 | O | O | O | 0.1 |
| 6 | O | X | O | 0.1 |
| 7 | O | X | O | 0.1 |
| 8 | Δ | O | O | 1.2 |
| 9 | O | O | O | 0.2 |
| 10 | O | O | O | 0.38 |
| 11 | O | Δ | O | 0.1 |
| 12 | O | O | O | 0.1 |
| 13 | O | O | O | 0.1 |
| 14 | O | O | O | 0.1 |
| 15 | O | O | O | 0.1 |
| 16 | O | O | O | 0.1 |

As shown in Table 1, when the stress at yield points was 12 MPa or more, the average of depths of the oviposition damages were 0.3 mm or less, and the number of times that the ovipositors of cicadae to reach the optical fiber core wires was able to be reduced.

Moreover, by making the 0.3% moduli be 50 MPa or more, the loss changes by the ovipositional behaviors of cicadae were able to be suppressed to be 0.2 dB or less.

Furthermore, by making the tensile strength be 20 MPa or less, the optical fiber core wires 1 were easily able to be taken out from the optical fiber cables 10 not only under the ordinary temperature environments but also under low temperature environments of about −20° C. or less.

Moreover, by making the Shore D hardness be 62 or less, good separation properties of supporting wire sections were able to be obtained.

Figure 5:
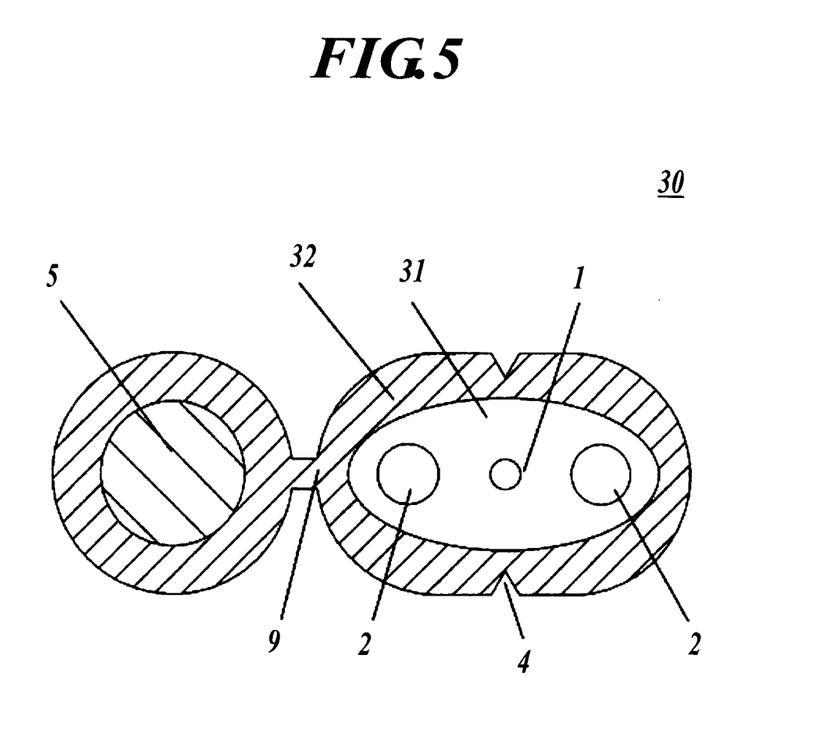
FIG. 5 is a cross sectional view showing another embodiment example of the optical fiber cable according to the present invention.

FIG. 5 is a cross sectional view showing another embodiment example of the optical fiber cable 10 of the present invention. The optical fiber cable 30 shown in FIG. 5 is different from the optical fiber cable shown in FIG. 1 in that an inner layer sheath 31 is applied to cover the optical fiber core wire 1 and the pair of tension members 2 and that an outer layer sheath 32 is applied to the outer periphery of the inner layer sheath 31. The inner layer sheath 31 is made of a thermoplastic resin such as a fire retarding polyolefin, which is generally used for a sheath, and the outer layer sheath 32 is made of a polymeric material having a stress at the yield point thereof of 12 MPa or more. Also in such an optical fiber cable 30, the possibility of the disconnecting of the optical fiber due to the ovipositional behaviors of a cicada and the like can be reduced by the outer layer sheath 32.

Figure 6:
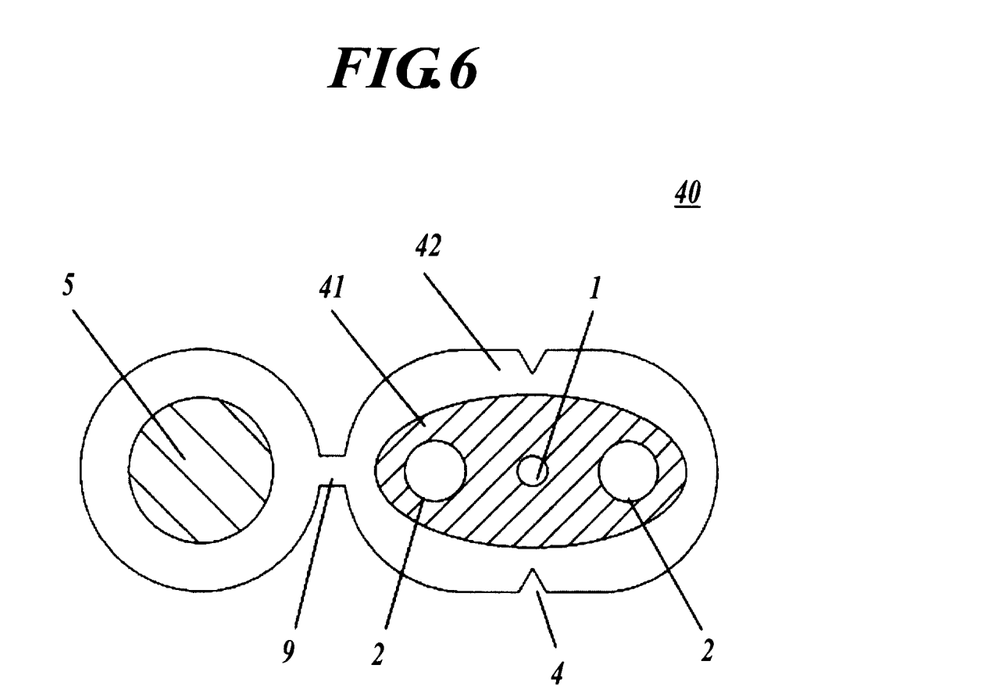
FIG. 6 is a cross sectional view showing another embodiment example of the optical fiber cable according to the present invention.

FIG. 6 is a cross sectional view showing another embodiment example of the optical fiber cable 10 of the present invention. The optical fiber cable 40 shown in FIG. 6 is different from the optical fiber cable shown in FIG. 1 in that an inner layer sheath 41 is applied to cover the optical fiber core wire 1 and the pair of tension members 2, and an outer layer sheath 42 is applied on the outer periphery of the inner layer sheath 41. The outer layer sheath 42 is made of a thermoplastic resin such as a fire retarding polyolefin, which is generally used for a sheath, and the inner layer sheath 41 is made of a polymeric material having a stress at the yield point thereof of 12 MPa or more. Also in such an optical fiber cable 40, the possibility of the disconnecting of the optical fiber caused by the ovipositional behaviors of a cicada and the like can be reduced by the inner layer sheath 41. Moreover, because the outer layer sheath 42 is made of the fire retarding polyolefin, which is generally used for a sheath, the optical fiber cable 40 can be treated similarly to a conventional optical fiber cable and the laying and the wiring thereof are easy.

Figure 7:
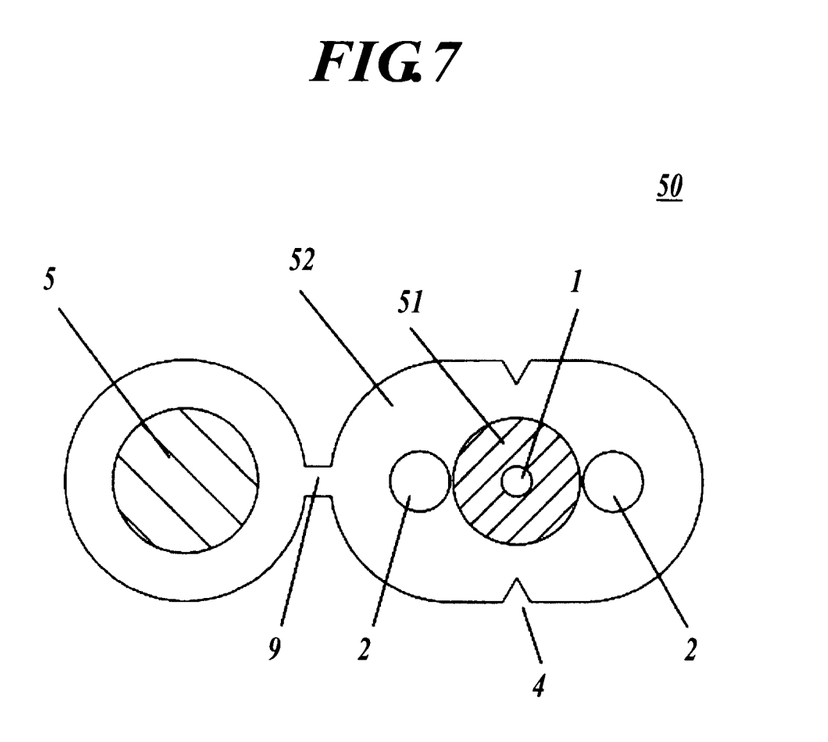
FIG. 7 is a cross sectional view showing another embodiment example of the optical fiber cable according to the present invention.

FIG. 7 is a cross sectional view showing another embodiment example of the optical fiber cable 10 of the present invention. The optical fiber cable 50 shown in FIG. 7 is different from the optical fiber cable shown in FIG. 1 in that an inner layer sheath 51 is applied to cover only the optical fiber core wire 1, and an outer layer sheath 52 is applied on the outer periphery of the inner layer sheath 51. The outer layer sheath 52 is made of a thermoplastic resin, such as a fire retarding polyolefin, which is generally used for a sheath, and the inner layer sheath 51 is made of a polymeric material having a stress at the yield point thereof of 12 MPa or more. Also in such an optical fiber cable 50, the possibility of the disconnecting of the optical fiber brought about by the ovipositional behaviors of a cicada and the like can be reduced by the inner layer sheath 51. Moreover, because the outer layer sheath 52 is made of the fire retarding polyolefin, which is generally used for a sheath, the optical fiber cable 50 can be treated similarly to a conventional optical fiber cable, and the laying and the wiring thereof are easy.

Figure 8:
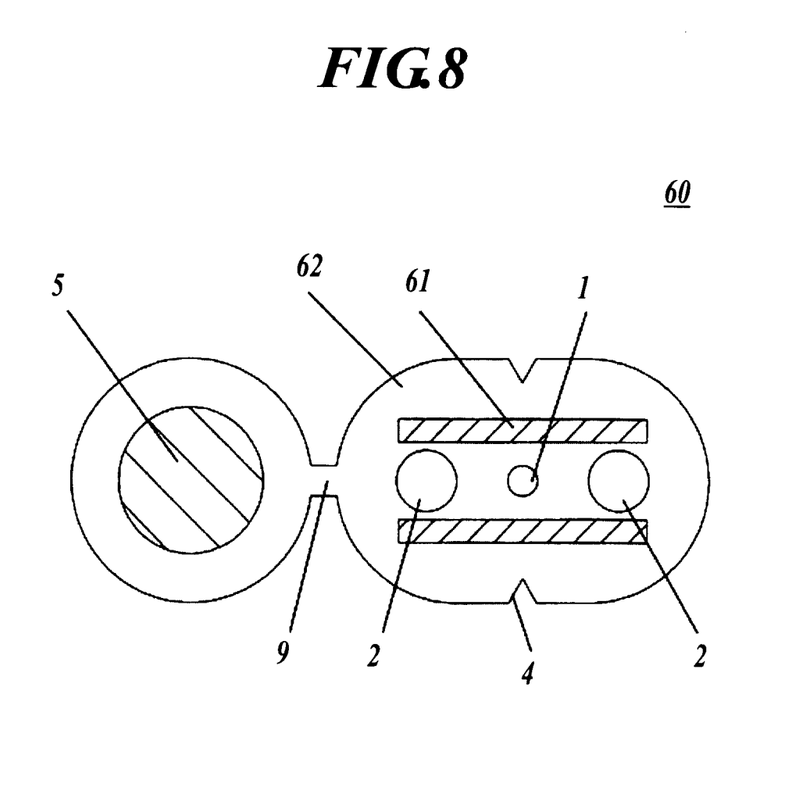
FIG. 8 is a cross sectional view showing another embodiment example of the optical fiber cable according to the present invention.

FIG. 8 is a cross sectional view showing another embodiment example of the optical fiber cable 10 of the present invention. The features of the optical fiber cable 60 shown in FIG. 8 is that, differently from the optical fiber cable shown in FIG. 1, the optical fiber cable 60 includes inner layer sheathes 61 and an outer layer sheath 62. Each of the inner layer sheathes 61 has a cross section of a rectangle. The inner layer sheathes 61 are arranged in parallel with the cable lengthwise direction to put the optical fiber core wire 1 between them having a predetermined spaces from the optical fiber core wire 1 in a direction (in the up and down direction in FIG. 8) crossing the plane composed of the optical fiber core wire 1 and the tension members 2 almost at right angles. The outer layer sheath 62 is applied to cover the optical fiber core wire 1, the pair of tension members 2, and the inner layer sheathes 61. Also in such an optical fiber cable 60, the possibility of the disconnecting of the optical fiber brought about by the ovipositional behaviors of a cicada and the like can be reduced by the inner layer sheathes 61. Moreover, because the outer layer sheath 62 is made of a fire retarding polyolefin, which is generally used, the optical fiber cable 60 can be treated similarly to a conventional optical fiber cable, and the laying and the wiring thereof are easy.

Description of Reference Numerals
1 optical fiber core wire
2 tension member
3 sheath
4 notch
5 supporting wire
9 linkage section
10 optical fiber cable
31, 41, 51, 61 inner layer sheath
32, 42, 52, 62 outer layer sheath

The invention claimed is:

1. An optical fiber cable comprising:
an optical fiber core wire;
a tension member arranged on one side or both sides of the optical fiber core wire in parallel with the optical fiber core wire; and
a sheath which integrally covers the optical fiber core wire and the tension member,
wherein at least a part of the sheath is made of a polymeric material having a stress at a yield point of 12 MPa or more, and
the polymeric material having a 0.3% modulus of 50 MPa or more and less than 800 MPa.

2. The optical fiber cable according to claim 1, wherein the polymeric material is composed of any one of a thermoplastic resin, a thermo-setting resin, and an ultraviolet curable resin.

3. The optical fiber cable according to claim 1, wherein the polymeric material has a tensile strength within a range of from 5 MPa or more to 20 MPa or less.

4. The optical fiber cable according to claim 1, wherein the polymeric material has Shore D hardness within a range of from 30 or more to 62 or less.

* * * * *